No. 729,809. PATENTED JUNE 2, 1903.
J. THOMAS-KILHAM.
FIRE AND WATER PROOF SAFE.
APPLICATION FILED DEC. 4, 1902.
NO MODEL.
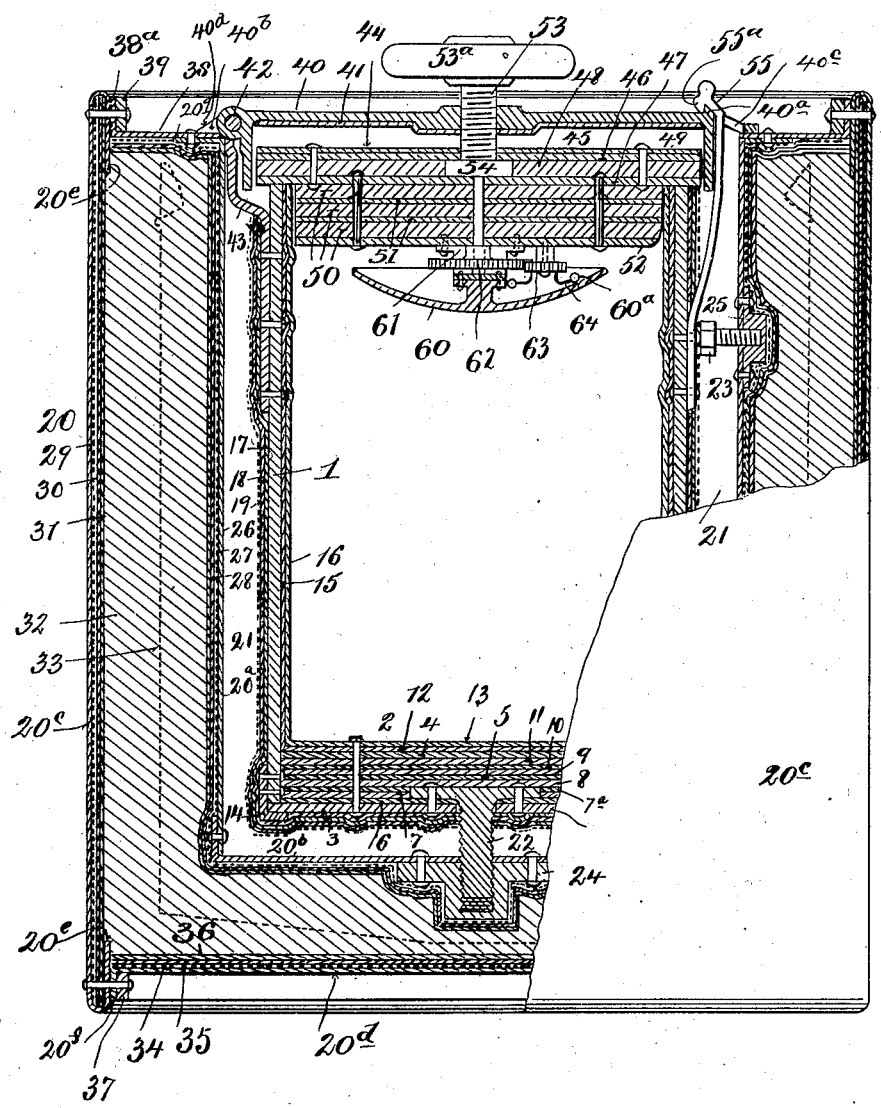
Witnesses:
Inventor:
John Thomas-Kilham.
by T. F. Bourne
his atty No. 729,809. Patented June 2, 1903.

UNITED STATES PATENT OFFICE.

JOHN THOMAS-KILHAM, OF BALDWINSVILLE, NEW YORK.

FIRE AND WATER PROOF SAFE.

SPECIFICATION forming part of Letters Patent No. 729,809, dated June 2, 1903.

Application filed December 4, 1902. Serial No. 133,812. (No model.)

*To all whom it may concern:*

Be it known that I, JOHN THOMAS-KILHAM, a citizen of the United States, and a resident of Baldwinsville, Onondaga county, New York, have invented certain new and useful Improvements in Fire and Water Proof Safes, of which the following is a specification.

The object of my invention is to provide a safe adapted to contain valuables which shall be simple in construction, capable of protecting its contents against relatively high heat and against damage by water, and which can be readily transported; and to this end my invention contemplates the novel details of improvement that will be more fully hereinafter set forth and then pointed out in the claims.

Reference is to be had to the accompanying drawing, forming part hereof, which is a partly-sectional side view of my improved safe.

In the drawing the numeral 1 indicates a tube made of suitable material, such as metal, so as to have considerable strength, at one end of which is a head or closure 2 of layers of fireproof material, preferably asbestos; but it may be made of layers of asbestos, pasteboard, or "salamander" and metal. In the example illustrated I have shown layers 3 4 and an intermediate layer 5 of metal, and interposed between the metal layers 3 5 are pasteboard and asbestos or salamander layers 6, 7, $7^a$, and 8, and between the metal layers 4 5 are pasteboard and asbestos or salamander layers 9, 10, and 11. The inner metal layer 4 is lined with asbestos and pasteboard or salamander layers 12 13. The layers of head 2 are all riveted together. The outer metal layer 3 rests against the end of tube 1, and head 2 is secured on tube 1 by clips 14, secured thereto, as shown. The tube 1 is provided with a fireproof lining, extending from head 2 about to the end of the tube, which lining may be made of asbestos or of one or more layers of asbestos and pasteboard or salamander 15 16. The tube so constructed provides a receptacle to contain valuables, papers, &c. Around tube 1 is a fireproof wrapping or layer, preferably made of asbestos and pasteboard or salamander 17 18, covered with wire gauze or netting 19. The tube 1, so lined and protected within and without, is placed within a casing 20, of suitable material, such as sheet metal protected with fireproof material, and said casing and tube 1 may be rectangular, cylindrical, or of other suitable shape. The inner end and the sides of said tube are at a distance from the inner walls of the case 20 to provide an air-space 21 around tube 1. The tube 1 is shown held within casing 20 by a screw 22, projecting from head 2, and by screws 23, extending inwardly from the inner wall $20^a$ of casing 20. The head of screw 22 is riveted to the metal layer 3 of head 2, fireproof layer 6 being shown interposed between layer 3 and the head of screw 22 and works in a nut or the like 24, riveted to the inner end wall $20^b$ of casing 20. The screws 23 work in nuts or the like 25, riveted to the inner wall $20^a$. When tube 1 is secured within casing 20 by screw 22, the screws 23 are set up against tube 1 to hold it in proper position within casing 20.

The casing 20 has inner and outer side walls $20^a$ and $20^c$ and inner and outer end walls $20^b$ and $20^d$, and between said walls is placed fireproof material 32. Adjacent to wall $20^a$ is wire gauze or netting 26 and layers of pasteboard or salamander and asbestos 27 28, and likewise adjacent to wall $20^c$ is located wire-gauze 29, asbestos 30, and pasteboard or salamander 31. Between said layers and walls is fireproof material, such as concrete or cement 32, and buried within the latter is wire gauze or netting 33. The layers 26, 27, and 28 extend over end wall $20^b$, and the wire-netting 34 and layers of asbestos and pasteboard or salamander 35 36 extend along end wall $20^d$, the cement 32 also lying between said end walls. By such construction of casing 20 the tube 1 is thoroughly protected against fire and the air-space 21 acts as a heat non-conductor. The ends $20^e$ of wall $20^c$ are bent over the ends of layers 29 30 31. The end wall $20^d$ has a flange $20^f$ fitting within the outer wall and riveted thereto, a band or hoop 37 assisting in holding the parts together. At the opposite end of casing 20 is a head 38, having an opening for the passage of tube 1 and provided with a flange $38^a$, riveted to wall $20^c$, a band or hoop 39 assisting in holding the parts. The ends of layers 26 27 28 lie under head 38. Wall $20^a$ has a flange $20^g$ lying under and riveted to head 38. In constructing the casing its head 38 will preferably be applied and the layers inserted, then the cement filled in, the layers 34 35 36 laid on, and, lastly, the end wall 20$^d$ applied and secured in place. The fireproof material or cement 32 embeds the layers firmly in place within the casing.

The cover I have shown for closing and protecting the open end of tube 1 is made fire and water proof and is arranged as follows: A cap 40 of hollow form, adapted to fit over the tube 1 and its coverings 17 18 19 and lined with asbestos 41, is preferably hinged to tube 1, as at 42, by a hinge-piece 43, secured to tube 1 and located mainly in air-space 21, the edges of the cap overlying tube 1. Cap 40 is provided with a flange 40$^d$, that rests on head 38, and is cut away or slotted at 40$^b$ 40$^c$ to receive hinge-piece 42 and latch 55. Within the cap 40 is a movable head 44, adapted to provide an air-space 45 between itself and cap 40, and the head I have shown is constructed as follows: Between two metal plates 46 and 47 is secured fireproof material—such as asbestos or pasteboard 48, or both—the plate 47 being adapted to rest upon the end of the tube 1, and the parts 46 47 48 are firmly secured together, as by rivets, asbestos 49 covering plate 46. The plate 47 carries a fireproof plug composed of asbestos or of one or more layers of asbestos and pasteboard 50 and interposed metal 51, beneath which is a metal plate or disk 52, the parts 50 51 52 being secured to the part 47 by rivets or the like. The plug is adapted to pass into the tube 1 or its lining. Means are provided for causing a water-tight fit between the cover and the tube 1, and to this end I provide a screw or threaded rod 53, which meshes with threads in the cap 40 and is journaled in plate 46 and provided with a head 54 between plates 46 47 and also has a hand-wheel or knob 53$^a$ for rotating it. The cover is held down in position by a latch or the like 55, secured to the tube 1, and shown provided with a finger 55$^a$, adapted to fit over a projection 40$^a$ on the cap 40 to form a sort of lock. When the cap is placed over the tube 1 and the latch 55 engages the cap, the movable head may be forced upon tube 1 and partly within the same by rotating screw 53, the hinge 42 and the latch 55 resisting the action of the screw. A very tight fit of the cover upon the tube 1 may thus be effected, as the action of the screw tends to force the movable head inwardly and the cap 40 outwardly; but as the cap is held by the hinge 42 and latch 55 and the projection 40$^a$ is forced into the finger 55$^a$ a firm locking is effected. By the arrangements described should the casing 20 become injured the cover 40 would remain attached to tube 1.

To give a signal when an attempt is made to open the safe, I provide a gong 60, which is carried by the movable head within tube 1, as by a bridge 61 connecting them, and to screw 53 I connect a gear 62, that meshes with a pinion 63, pivotally supported on said head and having clappers 64, adapted to engage knob 60$^a$ on gong 60 to sound the latter. Thus when screw 53 is rotated to remove the cap the clappers will be rotated and produce a signal.

A safe of the character described will be simple and comparatively cheap to manufacture and will afford a safe and reliable receptacle for valuables, papers, &c., as the tube 1 is protected from heat by the fireproof covering and by the movable head at the end. Tube 1 is also water-tight, as the movable head at the end can be adjusted to form a water-tight joint.

Having now described my invention, what I claim is—

1. A safe of the character described comprising a tube lined and surrounded by layers of fireproof material, a casing containing the same, fireproof material and wire-netting between the walls of the casing, an air-space being provided between the tube and the inner wall of the casing, one end of the tube opening through said casing, a cover to close the open end of said tube, and means for securing said cover in place, substantially as described.

2. A safe of the character described comprising a metal tube having a fireproof lining and a fireproof head at one end fireproof material and wire-netting surrounding the tube, a casing containing said tube, cement and layers of fireproof material interposed between the walls of the casing, a cover for the open end of the tube comprising fireproof material, and means for securing the cover in place, substantially as described.

3. A safe of the character described comprising a metal tube normally open at both ends and having a fireproof lining, and a plug at one end made of layers of fireproof material secured to the tube, layers of fireproof material around the tube, a fireproof casing surrounding the tube, means for supporting the tube within the casing at a distance from the inner wall thereof, the open end of the tube opening through the casing, a cover for the tube comprising fireproof material, and means for securing the cover over the tube, substantially as described.

4. A safe of the character described comprising a tube, a casing containing the same, fireproof material within the casing, one end of the tube opening through the casing, a cover for said tube comprising a cap adapted to overlie the tube and having a movable head comprising fireproof material adapted to close said tube, means for operating said head, and means for holding the cover in place, substantially as described.

5. A safe of the character described comprising a tube, a casing surrounding the tube, fireproof material within the casing, one end of the tube opening through the casing, a cover for the tube comprising a cap adapted to inclose the open end of the tube, a movable head in said cap composed of metal plates and fireproof material interposed between them, part of said head being arranged to bear upon the end of the tube and part to pass within the tube, means for operating said movable head, and means for holding the cover in place, substantially as described.

6. A safe of the character described comprising a tube, a casing containing the same, fireproof material in the casing, one end of the tube opening through the casing, a cover adapted to inclose said tube and comprising a cap and a movable head within the same, an air-chamber being formed between the head and cap, said head comprising metal plates and fireproof material interposed between them, part of the head being adapted to bear upon the end of the tube, a screw connecting said movable head with said cap, and means for holding the cap in place, whereby said screw can push the movable head against the tube, substantially as described.

7. A safe comprising a fireproof casing, a tube having a closure at one end, a screw and nut connecting one end of the tube in position within the casing, means for maintaining the tube within the casing, and means for closing the open end of the tube, substantially as described.

8. A safe comprising a casing having double walls, layers of fireproof material and wire-netting adjacent said walls, fireproof material between said layers and walls, a tube secured within said casing at a distance from its inner wall, and means for closing the open end of the tube, substantially as described.

9. A safe comprising a casing having double walls, means for closing the opening or space between said walls, wire-netting and layers of fireproof material adjacent said walls, fireproof material between said walls, wire-netting embedded within the center of said material, a tube within said casing, and means for closing the open end of said tube, substantially as described.

10. A safe comprising a fireproof casing, a tube within said casing, a cover for the tube having a head, a screw for operating said head, a gong carried by said head, and devices operated by said screw to sound said gong, substantially as described.

11. A safe comprising a fireproof casing, a tube within said casing, a cover for the tube having a cap and a movable head, a screw connecting the cap and the head, a gong carried by the head, and devices to be operated by the screw to sound the gong, substantially as described.

JOHN THOMAS-KILHAM.

Witnesses:
BERT SMITH,
THORNTON SMITH.